(12) United States Patent
Tenda

(10) Patent No.: US 11,947,414 B2
(45) Date of Patent: Apr. 2, 2024

(54) PRINTING ABNORMALITY INFORMATION PROCESSING SYSTEM, APPARATUS, DISPLAY METHOD, AND STORAGE MEDIUM

(71) Applicant: Tadashi Tenda, Tokyo (JP)

(72) Inventor: Tadashi Tenda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 214 days.

(21) Appl. No.: 17/524,935

(22) Filed: Nov. 12, 2021

(65) Prior Publication Data
US 2022/0156140 A1 May 19, 2022

(30) Foreign Application Priority Data
Nov. 17, 2020 (JP) .................... 2020-191124

(51) Int. Cl.
*G06F 11/00* (2006.01)
*G06F 11/07* (2006.01)
*H04N 1/00* (2006.01)

(52) U.S. Cl.
CPC ..... *G06F 11/0784* (2013.01); *H04N 1/00464* (2013.01); *H04N 1/00477* (2013.01); *H04N 1/00941* (2013.01)

(58) Field of Classification Search
None
See application file for complete search history.

(56) References Cited

U.S. PATENT DOCUMENTS

| | | | | |
|---|---|---|---|---|
| 10,248,286 | B2 * | 4/2019 | Furukawa | G06F 3/0486 |
| 2007/0035767 | A1 * | 2/2007 | Numata | G06Q 10/10 |
| | | | | 358/1.15 |
| 2011/0069340 | A1 * | 3/2011 | Asai | G03G 15/5079 |
| | | | | 358/1.15 |
| 2015/0077786 | A1 | 3/2015 | Tenda | |
| 2019/0163413 | A1 * | 5/2019 | Suzuki | G06F 3/1259 |

FOREIGN PATENT DOCUMENTS

| | | |
|---|---|---|
| JP | 2014-238780 | 12/2014 |
| WO | WO2017/150472 A1 | 9/2017 |

OTHER PUBLICATIONS

Google Scholar/Patents search—text refined (Year: 2023).*

* cited by examiner

*Primary Examiner* — Christopher S McCarthy
(74) *Attorney, Agent, or Firm* — IPUSA, PLLC

(57) ABSTRACT

An information processing system includes a plurality of apparatuses and an information processing apparatus. The plurality of apparatuses includes a first apparatus and a second apparatus. The first apparatus includes a first communication unit and a switching unit. The first communication unit is configured to receive screen information about the second apparatus sent from the information processing apparatus. The screen information is displayed on a first application program in the first apparatus. The switching unit is configured to switch a screen of a second application program to the screen of the first application program to display the screen of the first application program in response to receipt of the screen information by the first communication unit, when the first apparatus displays the screen of the second application program. The information processing apparatus is configured to communicate with the plurality of apparatuses. The information processing apparatus includes a second communication unit that is configured to transmit the screen information to the first apparatus.

8 Claims, 11 Drawing Sheets

PRINTING ABNORMALITY INFORMATION PROCESSING SYSTEM, APPARATUS, DISPLAY METHOD, AND STORAGE MEDIUM

CROSS-REFERENCE TO RELATED APPLICATION

This patent application is based on and claims priority pursuant to 35 U.S.C. § 119(a) to Japanese Patent Application No. 2020-191124, filed on Nov. 17, 2020, in the Japan Patent Office, the entire disclosure of which is incorporated by reference herein.

BACKGROUND

Technical Field

Embodiments of the present disclosure relate to an information processing system, an apparatus, a display method, and a storage medium.

Related Art

Some abnormality may occur in an apparatus such as an image forming apparatus. The apparatus displays the occurrence of the abnormality on a device such as an operation panel, disposed in the apparatus. However, when a plurality of apparatuses operates and any abnormality has occurred in an apparatus, it is difficult to identify the apparatus having the abnormality until a user approaches the apparatus. Even if the user specifies the apparatus having the abnormality from a distance, the detail of the abnormality is not determined.

A technology is known to manage a plurality of apparatuses using a server. A known web application server acquires transaction information from a plurality of automatic teller machines (ATMs) and provides a host server with aggregate information obtained by aggregating the transaction information of the plurality of ATMs.

SUMMARY

Embodiments of the present disclosure described herein provide a novel information processing system including a plurality of apparatuses and an information processing apparatus. The plurality of apparatuses includes a first apparatus and a second apparatus. The first apparatus includes a first communication unit and a switching unit. The first communication unit is configured to receive screen information about the second apparatus sent from the information processing apparatus. The screen information is displayed on a screen of a first application program in the first apparatus. The switching unit is configured to switch a screen of a second application program to the screen of the first application program and displays the screen of the first application program in response to receipt of the screen information by the first communication unit, when the first apparatus displays the screen of the second application program. The information processing apparatus includes a second communication unit. The second communication unit is configured to transmit the screen information to the first apparatus.

Further, embodiments of the present disclosure described herein provide an apparatus including a communication unit and a switching unit. The communication unit is configured to receive screen information about another apparatus. The screen information is sent from an information processing apparatus. The information processing apparatus is configured to communicate with the apparatus and the screen information is displayed on a first application program. The first application program is executed in the apparatus. The switching unit is configured to switch a screen of a second application program to the screen of the first application program to display the screen of the first application program in response to receipt of the screen information by the communication unit, when the apparatus displays the screen of the second application program.

Further, embodiments of the present disclosure described herein provide a display method performed by an information processing system including a first apparatus, a second apparatus, and an information processing apparatus configured to communicate with the first apparatus and the second apparatus. The display method includes receiving screen information about the second apparatus sent from the information processing apparatus to a first communication unit of the first apparatus, the screen information being displayed on a screen of a first application program in the first apparatus, and switching a screen of a second application program to the screen of the first application program when the first apparatus displays the screen of the second application program in response to the receiving of the screen information.

Further, embodiments of the present disclosure described herein provide a non-transitory, computer-readable storage medium storing computer-readable program code that causes a computer of a first apparatus, which is communicable to an information processing apparatus. The storage medium executes receiving screen information about a second apparatus sent from the information processing apparatus to a first communication unit of the first apparatus, the screen information being displayed on a screen of a first application program in the first apparatus, and switching a screen of a second application program to the screen of the first application program to display the screen of the second application program when the first apparatus displays the screen of the second application program in response to the receiving of the screen information.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
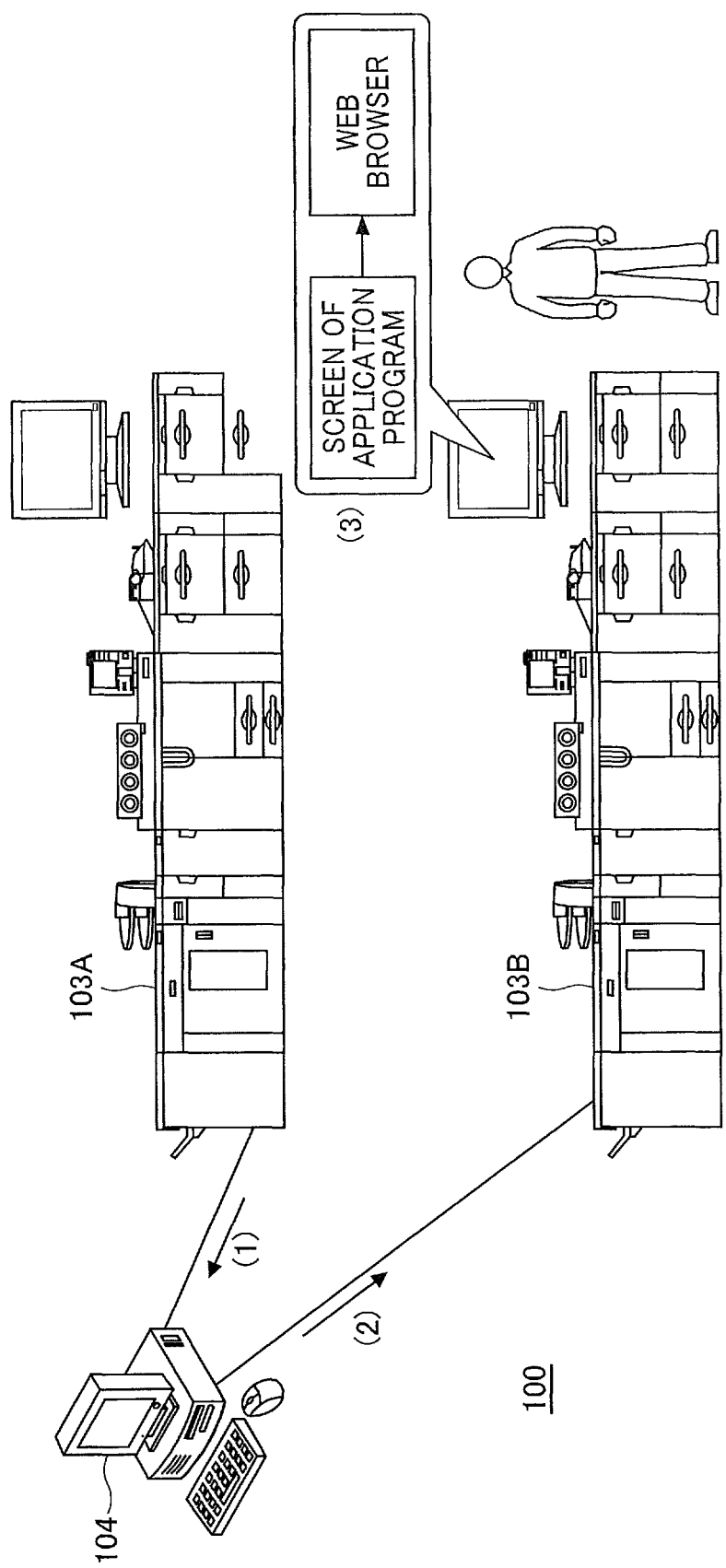
FIG. 1 is a diagram illustrating an outline of an operation of an information processing system.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

Hereinafter, as an example of embodiment of the present disclosure, descriptions are given applicable to an information processing system and a display method provided by the information processing system.

Outline

FIG. 1 is a diagram illustrating an outline of an operation of an information processing system 100. As illustrated in FIG. 1, two or more image forming apparatuses 103 (image forming apparatuses 103A and 103B in FIG. 1) are connected to a server 104 to communicate. That is, a plurality of apparatuses is connected to the server 104 to communicate with the server 104.

The image forming apparatus 103 executes an application program separately from a web browser that displays a web page or executes a web application program. For example, the image forming apparatus 103 displays a screen of any personal computer (PC) by a remote desktop application program. Further, the image forming apparatus 103 displays information from the server 104 (for example, information regarding an abnormality of another image forming apparatus 103) by a web browser (an example of a first application program).

However, since the image forming apparatus 103 does not display a web browser while the remote desk top application program (an example of a second application program) is being executed, the image forming apparatus 103 does not display the status of another image forming apparatus 103. For example, only the web browser displays abnormality such as the occurrence of a paper jam and the occurrence of running out of a sheet. Due to such a configuration, in a case where the user is operating the application program (in a case where the image forming apparatus 103 under operation by the user is executing the application program), the user does not notice the occurrence of the abnormality of another image forming apparatus 103 not under operation by the user. It takes time for the user to recognize the abnormality of another image forming apparatus 103 not under operation by the user, and the print job is stopped during the time.

In order to avoid this inconvenience, the information processing system 100 according to the present embodiment operates as follows. The image forming apparatus 103A that functions as a second apparatus detects an abnormality and notifies the server 104 of the abnormality. The server 104 notifies the image forming apparatus 103B that functions as a first apparatus of information about the abnormality of the image forming apparatus 103A. The image forming apparatus 103B determines whether an application program other than the web browser is being executed (or active). When the application program is being executed, the image forming apparatus 103B switches the active program from the application program to the web browser, then displays an abnormality of the image forming apparatus 103A.

As described above, the image forming apparatus 103B according to the present embodiment automatically switches the screen displayed on the operation panel to the web browser, when an abnormality occurs in the image forming apparatus 103A, while the image forming apparatus 103B is executing an application program such as a remote desktop application program and the operation panel displays the screen of the image forming apparatus 103B. Therefore, the image forming apparatus 103B that is executing the application program displays information of another image forming apparatus such as the image forming apparatus 103A. According to this configuration, the user of the image forming apparatus 103B notices that an abnormality occurs in the image forming apparatus 103A in a short time from the occurrence of the abnormality.

Terms

The abnormal state refers to a state different from the normal state. In the case of an apparatus, the abnormal status includes a status in which an expected output is not obtained or a status in which an unexpected output is obtained. In addition to the abnormal status, the status different from the normal status is referred to as an error, a fault, or a failure.

The information related to the abnormality is information indicating that what kind of abnormality has occurred in which one of the image forming apparatuses 103. The information related to the abnormality includes, for example, a code (identification information) indicating the content of the abnormality, identification information of the image forming apparatus 103, an occurrence time, an execution status of the print job.

A web browser in the present disclosure is a program for connecting an information processing apparatus to a web server. The web browser has functions such as a function of displaying a web page and a function of following a hyperlink.

Any application program in the present disclosure is an application program other than the web browser. The web browser is also an application program strictly. However, the web browser is different from a general application program in that the web browser does not display information on the web browser unless the web browser communicates with the web server. Note that any application program in the present disclosure is assumed to display a certain screen. An application program other than the web browser is referred to as a native application program when such an application program is distinguished from the web application program.

Switching from the screen of the application program to the screen of the web browser indicates that the apparatus displays the screen of the web browser alone when the apparatus simply displays the screen of the application program (full-screen display). When the apparatus displays the screen of the application program in front of another application program, the apparatus displays the screen of the web browser in front of another application programs (displays the screen closest to the user). Displaying only the screen of the web browser alone or displaying the screen closest to the user is referred to as a status in which the web browser is active or a status in which an operation by a user is acceptable.

System Configuration

Figure 2:
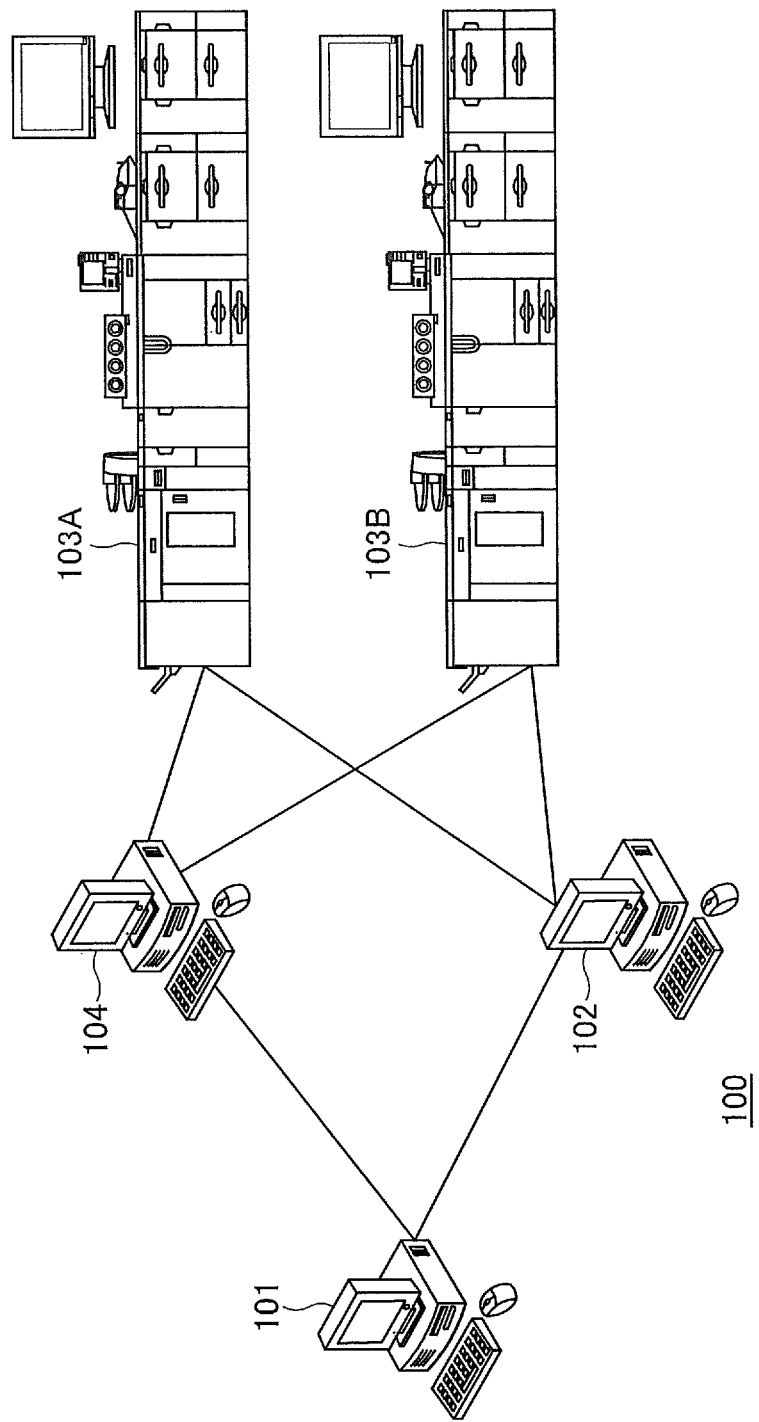
FIG. 2 is a diagram illustrating a system configuration of the information processing system.

FIG. 2 is a diagram illustrating a system configuration of the information processing system 100 according to the present embodiment. The information processing system 100 includes a terminal device 101, a digital front end (DFE) 102, two or more image forming apparatuses 103, and the server 104.

The terminal device 101 and the server 104 communicate with each other via a network. Similarly, the terminal device 101 and the DFE 102 communicate with each other via a network. The network includes, for example, a local area network (LAN) in a facility in which the image forming apparatus 103 is installed, and further includes the Internet if the server 104 or the DFE 102 is installed on the Internet.

The server 104 and each of the image forming apparatuses 103 may be connected on a one-to-one basis via a dedicated line or may be connected via a network. The DFE 102 and each of the image forming apparatuses 103 may be connected on a one-to-one basis via a dedicated line or may be connected via a network. Note that the DFE 102 and each of the image forming apparatuses 103 may be integrated with each other or may be detachably attached to each other.

A web browser operates in the terminal device 101. A web browser accesses the server 104 to display various kinds of information. The terminal device 101 receives an operation such as a change of a setting value for the image forming apparatuses 103 from a general user, then transmits the operation to the server 104. The server 104 transmits the setting value to the image forming apparatuses 103.

Note that an administrator or a general user input a user ID and a password to the terminal device 101 to log in to the server 104 from the terminal device 101. The terminal device 101 transmits the user ID and the password of an operator (i.e., the administrator or the general user in this case) to the server 104. When an authentication by the server 104 is successful, the operation is specified to be a general user or an administrator. The screen to be displayed or an item to be input may be different according to whether the operator is a general user or an administrator. Note that the authentication server may authenticate the administrator or the general user.

The terminal device 101 is, for example, a personal computer (PC), a smartphone, a tablet computer, a personal digital assistant (PDA), or a wearable PC (such as a sunglass type or a wristwatch type). Further, at least the terminal device 101 has a communication function and executes the web browser or the application program dedicated to the server 104. For example, the terminal device 101 may be a car navigation system, a game machine, or a television receiver.

Two or more image forming apparatuses 103 are registered in the server 104 in advance, and the server 104 periodically monitors the life and death of the registered image forming apparatuses 103. Further, the server 104 may periodically inquire the image forming apparatus 103 about the abnormality or receive a notification of the abnormality from the image forming apparatus 103 without inquiring.

The server 104 generates screen information of a screen displayed by the web browser. The screen information is a program described in, for example, hyper text markup language (HTML), extensible markup language (XML), a script language, and a cascading style sheet (CSS), The structure of the web page is specified by HTML, the operation of the web page is defined by the script language, and the style of the web page is specified by the CSS. In addition, an application program implemented by cooperation of screen information on the client side and an application program or a database on the server side is referred to as a web application program. In the present embodiment, the server 104 and either of the terminal device 101 or the image forming apparatus 103 selectively cooperate with each other to execute the web application program.

As described above, the server 104 provides a user interface (input operation screen) for operating the terminal device 101 to the administrator or the general user. Since the web browser operates in the image forming apparatus 103, the server 104 provides a user interface (input operation screen) for operating the image forming apparatus 103 to the administrator or the general user. The server 104 includes one or more information processing apparatuses.

The server 104 may include an input/output device such as a display, a keyboard, or a mouse, and the server 104 may provide a user interface. In this case, the administrator or the general user directly operates the server 104 without using the terminal device 101.

The DFE 102 is originally a control device that performs, for example, reception of a print job to be executed by the image forming apparatus 103, image processing (Raster Image Processor or RIP), and progress management during executing.

The DFE 102 may have the function of the server 104 to perform operations without the server 104.

The image forming apparatus 103 is an example of an apparatus that executes a print job in response to a request received by the DFE 102. When an abnormality occurs in the image forming apparatus 103, the image forming apparatus 103 transmits the information on the abnormality to the server 104. When the administrator or the general user operates the terminal device 101 to transmit a changed setting value to the server 104, the image forming apparatus 103 receives the changed setting value from the server 104 and sets the changed setting value in the image forming apparatus 103.

The image forming apparatus 103 has a function of printing an image on a sheet. A method of forming an image includes an electrophotographic method and an inkjet method. The image forming apparatus 103 may be a multi-function peripheral or product or printer (MFP). The image forming apparatus 103 may be referred to as a printer or a printing apparatus.

Any image forming apparatus is referred to as an image forming apparatus 103, and specific image forming apparatuses are referred to as, for example, the image forming apparatus 103A and the image forming apparatus 103B when distinguished from each other.

The image forming apparatus 103 according to the present embodiment may be a commercial printer. The commercial printer is not a device for printing a printed material for internal use by an employee in a company, but a device for commercial printing in which a printed material becomes a commercial product. In the commercial printing, the image forming apparatus 103 outputs a printed material used for business activities of general companies and organizations. For example, in the commercial printing, the image forming apparatus 103 may output leaflets, brochures, posters, catalogs, company brochures, and manuals. The image forming apparatus 103 for office use and the image forming apparatus 103 for commercial use are different from each other mainly in the printing speed, image quality, type, or size of a corresponding paper.

The configuration and functions of the present embodiment is applicable to apparatuses other than the image forming apparatus 103. The apparatus may be, for example, a projector (PJ), an electronic blackboard, a video conference terminal, a digital signage, a head up display (HUD) device, an industrial machine, an imaging device, a sound collecting device, a medical device, a network home appliance, a game machine, an ATM, a wearable PC, or a desktop PC.

Note that the configuration of the information processing system 100 illustrated in FIG. 2 is an example, and any one of the image forming apparatuses 103 may have the function of the server 104. In this case, the image forming apparatus 103 operates without the server 104. The server 104 may have the function of the DFE 102. In this case, the server 104 operates without the DFE 102. The image forming apparatus 103 may have a function of DFE 102 and the server 104.

Hardware Configuration

Server

Figure 3:
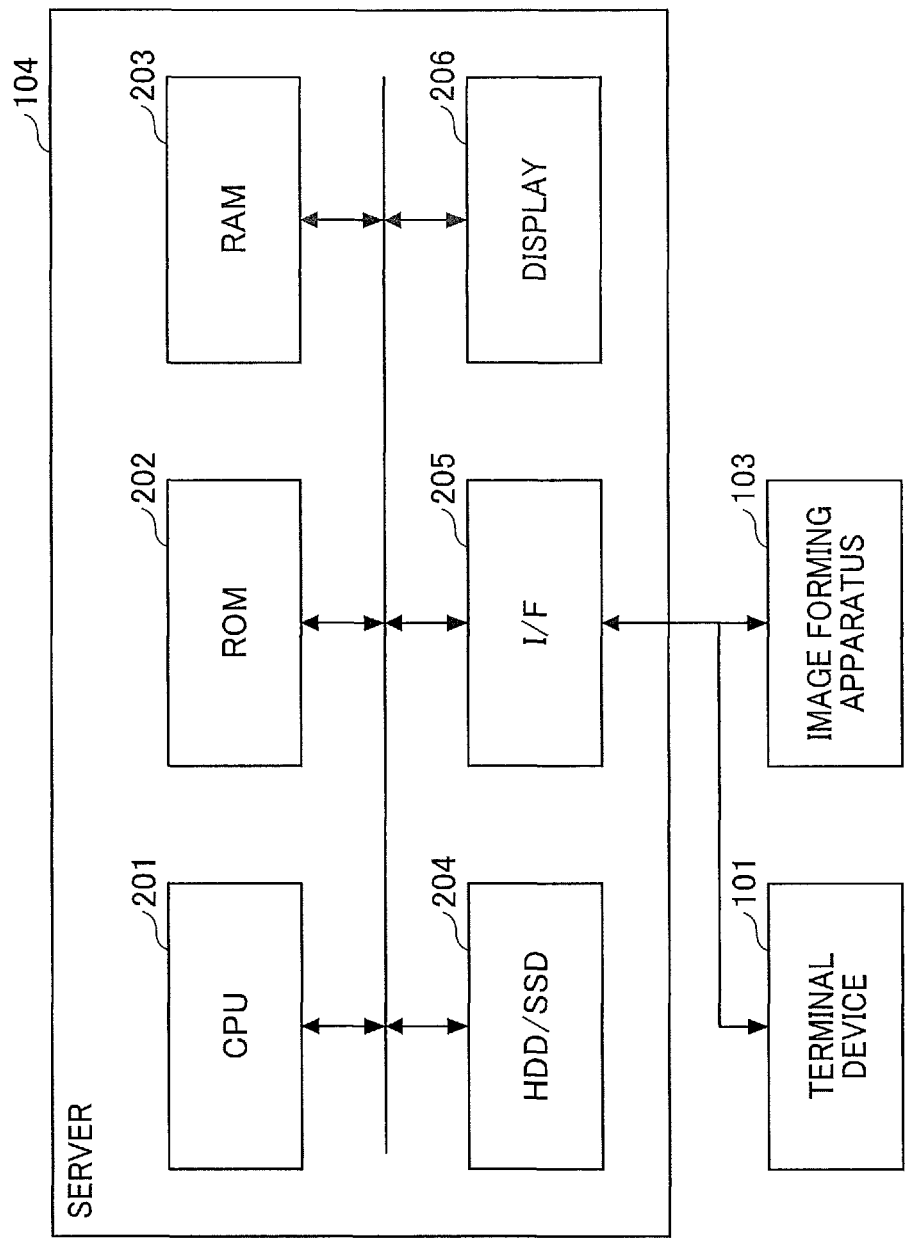
FIG. 3 is a diagram illustrating a hardware configuration of a server.

FIG. 3 is a diagram illustrating a hardware configuration of the server 104. The server 104 has the same configuration as a computer. The server 104 includes a central processing unit (CPU) 201, a read-only memory (ROM) 202, a random access memory (RAM) 203, a hard disk drive (HDD)/solid status drive (SSD) 204, an interface (I/F) 205, and a display 206.

The CPU 201 uses the RAM 203 as a work area and executes a program stored in the ROM 202.

The HDD/SSD 204 is used as a storage unit. The information stored in the HDD/SSD 204 may be used when the CPU 201 reads and executes the program.

The I/F 205 is an interface that enables communication with each of the image forming apparatus 103 and the terminal device 101.

The display 206 displays information transmitted from the server 104 on a web browser.

Note that the hardware configuration of the terminal device 101 may be the same as or different from the hardware configuration of the server 104 in the present embodiment.

Image Forming Apparatus

Figure 4:
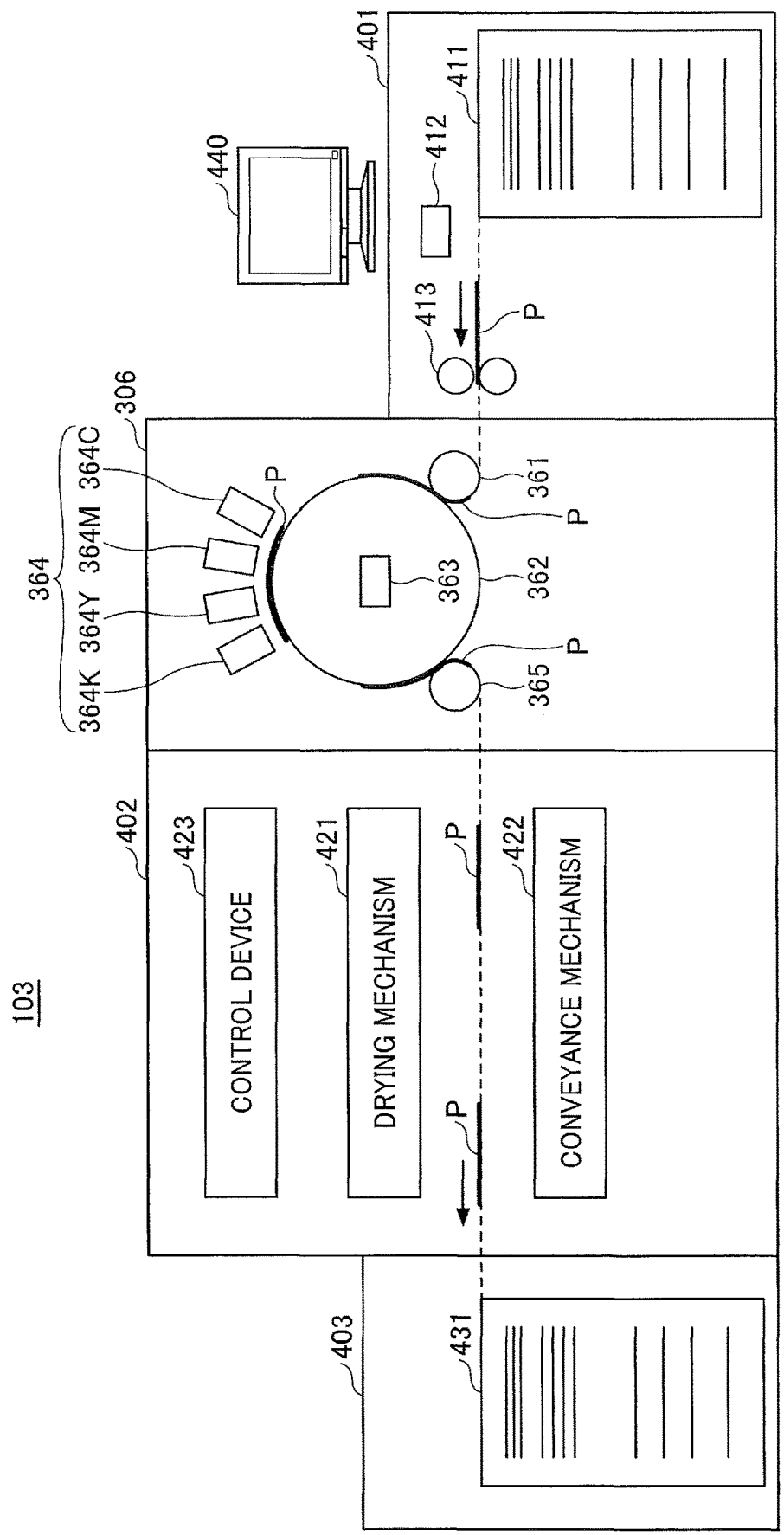
FIG. 4 is a diagram illustrating a schematic configuration of an image forming apparatus.

FIG. 4 is a schematic diagram illustrating a schematic configuration of the image forming apparatus 103 according to the present embodiment. The image forming apparatus 103 is, for example, an inkjet image forming apparatus. The image forming apparatus 103 mainly includes a sheet feeder 401, an image forming device 306, a drying device 402, a sheet ejection device 403, and a control device 423. In the image forming apparatus 103, the image forming device 306 forms an image on a sheet P with ink as an image forming liquid. The sheet P is a recording material as a sheet material and fed from the sheet feeder 401. After the ink applied onto the sheet P is dried by the drying device 402, the sheet P is ejected by the sheet ejection device 403.

The sheet feeder 401 mainly includes a sheet feeding tray 411, a feeding device 412, and a registration roller pair 413. The sheet feeding tray 411 loads a plurality of sheets P. The feeding device 412 separates and feeds sheets P one by one from the sheet feeding tray 411. The registration roller pair 413 feeds the sheet P to the image forming device 306. The feeding device 412 may have a configuration employing a roller or a roll or a configuration employing an air suction method. The feeding device 412 sends out the sheet P from the sheet feeding tray 411. After the leading end of the sheet P fed from the sheet feeding tray 411 reaches the registration roller pair 413, the registration roller pair 413 is driven at a predetermined timing, to feed the sheet P to the image forming device 306. In the present embodiment, the configuration of the sheet feeder 401 is not limited to the above-described configuration but may be any particular configuration, as long as the sheet feeder 401 feeds the sheet P to the image forming device 306.

The image forming device 306 mainly includes a sheet receiving cylinder 361, a sheet conveyor drum 362, an ink discharge unit 364, and a sheet transfer cylinder 365. The sheet receiving cylinder 361 receives the sheet P and forwards the sheet P to the sheet conveyor drum 362. The sheet conveyor drum 362 conveys the sheet P fed from the sheet receiving cylinder 361 while carrying the sheet P on the outer peripheral surface of the sheet conveyor drum 362. The ink discharge unit 364 discharges ink toward the sheet P on the sheet conveyor drum 362. The sheet transfer cylinder 365 transfers the sheet P conveyed from the sheet conveyor drum 362 to the drying device 402. The leading end of the sheet P conveyed from the sheet feeder 401 to the image forming device 306 is gripped by a sheet gripper (or grippers) disposed on the surface of the sheet receiving cylinder 361. The sheet gripper grips the leading end of the sheet P and conveys the sheet P as the sheet receiving cylinder 361 rotates, in other words, as the surface of the sheet receiving cylinder 361 moves. The sheet P conveyed by the sheet receiving cylinder 361 is transferred to the sheet conveyor drum 362 at a position at which the sheet receiving cylinder 361 faces the sheet conveyor drum 362.

The sheet conveyor drum 362 has a sheet gripper (or grippers) on the surface, and the leading end of the sheet P is gripped by the sheet gripper. The sheet conveyor drum 362 includes a plurality of suction holes formed dispersedly in the surface of the sheet conveyor drum 362. A suction device 363 generates a sucking-in airflow orienting inside the sheet conveyor drum 362 through each suction hole. When the sheet P is forwarded from the sheet receiving cylinder 361, the leading end of the sheet P is gripped by the sheet gripper mounted on the sheet conveyor drum 362. The sheet P is attracted to the surface of the sheet conveyor drum 362 by the sucking-in airflow generated by the suction device 363 and conveyed as the sheet conveyor drum 362 rotates.

The ink discharge unit 364 of the present embodiment discharges four color inks of cyan (C), magenta (M), yellow (Y), and black (K), to form an image. The ink discharge unit 364 includes individual liquid discharge heads 364C, 364M, 364Y, and 364K for each ink. The configurations of the liquid discharge heads 364C, 364M, 364Y, and 364K are not limited to the above-described configurations and may be any other configuration suitable for liquid discharge. The ink discharge unit 364 of the image forming apparatuses 103 may include a liquid discharge head that discharges a special ink such as white, gold, or silver according to the setting. Further, the ink discharge unit 364 may include a liquid discharge head that discharges a liquid that does not contribute to image formation, such as a surface coating liquid.

The discharge operations of the liquid discharge heads 364C, 364M, 364Y, and 364K of the ink discharge unit 364 are controlled by drive signals corresponding to image data. When the sheet P carried by the sheet conveyor drum 362 passes through the region facing the ink discharge unit 364, the ink discharge unit 364 discharges respective color inks from the liquid discharge heads 364C, 364M, 364Y, and 364K. As a result, the ink discharge unit 364 forms an image, on the sheet P, corresponding to the image data. In the present embodiment, the configuration of the image forming device 306 is not limited to the above-described configuration but may be any particular configuration as long as an image is formed by applying liquid onto the sheet P.

The drying device 402 includes a drying mechanism 421 and a conveyance mechanism 422. The drying mechanism 421 dries the ink applied to the sheet P by the image forming device 306. The conveyance mechanism 422 conveys the sheet conveyed from the image forming device 306. The sheet P conveyed from the image forming device 306 is received by the conveyance mechanism 422. The conveyance mechanism 422 conveys the received sheet so as to pass through the drying mechanism 421 and forwards the sheet P to the sheet ejection device 403. The drying mechanism 421 dries the ink on the sheet P passing through the drying mechanism 421. As a result, liquid components such as moisture in the ink evaporate. As the moisture in the ink evaporates, the ink is fixed to the sheet P, and curling of the sheet P is reduced.

The sheet ejection device 403 mainly includes a sheet ejection tray 431 on which a plurality of sheets is stacked. The sheet P conveyed from the drying device 402 is sequentially stacked and held on the sheet ejection tray 431. Note that in the present embodiment, the configuration of the sheet ejection device 403 is not limited to the above-described configuration but may be any particular configuration as long as the sheet P is ejected.

The control device 423 is an information processing device that controls the image forming apparatus 103. The control device 423 includes, for example, a CPU, a RAM, a ROM, an SSD (HDD), and a communication device. The control device 423 communicates with the DFE 102 to receive setting values and operation requests according to execution of the print job.

The image forming apparatus 103 includes an operation panel 440. The operation panel 440 is a flat panel display such as a liquid crystal display having a touch panel. The operation panel 440 displays a screen information generated by an application program or a web browser, and receives a user operation. Note that the operation panel 440 may not be integrated with the image forming apparatus 103 and may be externally attached to the image forming apparatus 103.

Functions

Figure 5:
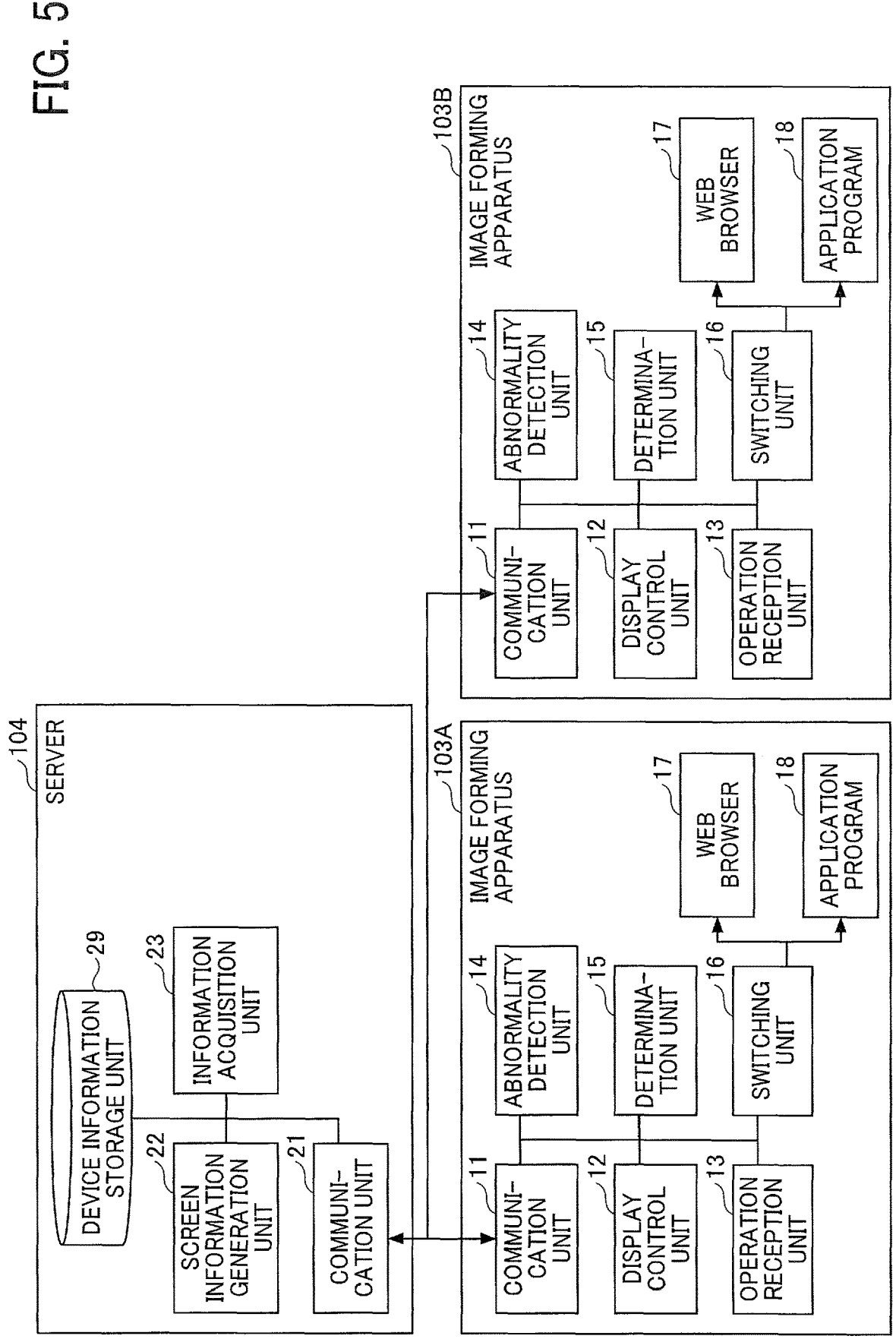
FIG. 5 is a functional block diagram illustrating the functions of the server and the image forming apparatus, with the functions being divided into blocks.

FIG. 5 is a functional block diagram illustrating functions of the server 104 and the image forming apparatuses 103A and 103B. The functions are divided into blocks. Note that the image forming apparatuses 103A and 103B are also referred to as the image forming apparatus 103 for convenience. Note that the functions of the terminal device 101 and the DFE 102 are omitted here and explained accordingly.

Server

As illustrated in FIG. 5, the server 104 includes a communication unit 21, a screen information generation unit 22, and an information acquisition unit 23. The functions of the server 104 illustrated in FIG. 5 are functions or methods achieved by the CPU 201 executing instructions included in one or more programs installed in the server 104.

The server 104 includes a device information storage unit 29. The storage unit included in the server 104 is implemented by the HDD/SSD 204 and the RAM 203 included in the server 104.

Note that each function of the server 104 includes a function of a web application achieved by cooperation of a server function of the server 104, and a web browser of the image forming apparatus 103.

The communication unit 21 mainly communicates with the image forming apparatus 103 and monitors the status of the image forming apparatus 103. Further, the communication unit 21 transmits screen information to the image forming apparatus 103. The screen information is displayed by the web browser executed in the image forming apparatus 103 to notify the status of the image forming apparatus 103. When an abnormality occurs in the image forming apparatus 103, the communication unit 21 receives information on the abnormality from the image forming apparatus 103. The communication unit 21 functions as a second communication unit.

Note that the communication unit 21 may communicate with the image forming apparatus 103 according to a bidirectional communication standard such as WebSocket. Since bidirectional communication is available, push communication is performed from the server 104 to the image forming apparatus 103 without a request from the image forming apparatus 103.

The information acquisition unit 23 acquires information on the status of the image forming apparatus 103 from the image forming apparatus 103 via the communication unit 21. The information on the status of the image forming apparatus 103 includes, for example, a setting value of the device, a list of print jobs, an execution status of the print job, and information on an abnormality. As indicated in Table 1, the image forming apparatuses 103A and 103B to be managed are registered in the server 104. The information acquisition unit 23 identifies and communicates with the image forming apparatus 103 by the internet protocol (IP) address of the image forming apparatus 103. The communication may be performed from the information acquisition unit 23 or from the image forming apparatus 103.

The screen information generation unit 22 generates the above-described screen information based on the information related to the status of the image forming apparatus 103 so as to update the screen displayed by the image forming apparatus 103. The screen information generation unit 22 generates, for example, screen information indicating the status of one image forming apparatus 103 and the status of another image forming apparatus 103. This status includes, for example, information related to an abnormality such as occurrence of a jam or occurrence of running out of a sheet.

TABLE 1

| ID | IP Address | Name | Manufacturer | Product Model |
|---|---|---|---|---|
| 001 | 1.1.1.1 | Image forming apparatus A | Printgood | ABC-1 |
| 002 | 1.1.1.2 | Image forming apparatus B | Printgood | ABC-1 |
| ... | ... | ... | ... | ... |

Table 1 indicates information about the image forming apparatus 103 registered in the device information storage unit 29 of the server 104. The information about the image forming apparatus 103 includes items of an ID, an IP address, a manufacturer, and a product model in association with each other. "ID" in Table 1 is identification information used to identify the image forming apparatus 103. Note that an ID refers to a combination of, for example, a name, a code, a character string, and a numerical value, each being used to uniquely distinguish a specific object from a plurality of objects. The ID may be referred to as an identification information. "IP Address" in Table 1 is a number used to identify a device that transmits and receives a packet on the IP network. The IP address is assigned by a dynamic host configuration protocol (DHCP) server. The assignment includes a setting to assign a fixed IP address, and the IP address of the image forming apparatus 103 is fixed. "Name" in Table 1 is a name used when a general user calls the image forming apparatus 103, such as a product name of the image forming apparatus 103. "Manufacturer" in Table 1 is a name of manufacturer or name of distributor of the image forming apparatus 103. "Model" in Table 1 is a model number or a device number of the image forming apparatus 103.

Image Forming Apparatus

In the description of the present embodiment, the functions of the image forming apparatus 103A and the image forming apparatus 103B may be the same.

The image forming apparatus 103 (i.e., any of the image forming apparatuses 103A and 103B) includes a communication unit 11, a display control unit 12, an operation reception unit 13, an abnormality detection unit 14, a determination unit 15, and a switching unit 16. These functions of the image forming apparatus 103 are functions or methods achieved by the control device 423 executing instructions included in one or more programs installed in the image forming apparatus 103.

In the present embodiment, this program may be an active application program 18, a web browser 17, or another software. Another software may be one of the application programs or may be a program that operates inside of the image forming apparatus 103 such as firmware.

The communication unit 11 mainly communicates with the server 104. The communication unit 11 transmits information on the status of the image forming apparatus 103 including information on the abnormality to the server 104, and receives notification and screen information transmitted by the server 104. The communication unit 11 functions as a first communication unit. The communication unit 11 is achieved by any program of the active application program 18, the web browser 17, or another software.

The display control unit 12 analyzes the screen information and displays the status of an image forming apparatus 103 on the operation panel 440. The status of the image forming apparatus 103 is deferred. The display control unit 12 may display a screen of an application program. The display control unit 12 is achieved by any program of the active application program 18, the web browser 17, or another software.

The operation reception unit 13 receives a user operation on the operation panel 440. The operation reception unit 13 is achieved by any program of the active application program 18, the web browser 17, or another software.

The abnormality detection unit 14 monitors the presence or absence of an abnormality in a basic function (e.g., sheet feeding, temperature, humidity, image formation) of the image forming apparatus 103. In the case of sheet feeding (paper jam), the abnormality detection unit 14 detects that the sheet sensor provided in the sheet conveyance passage continuously detects the sheet. In the case of skew detection, a sensor included in the abnormality detection unit 14 detects that the sheet is inclined. Further, the abnormality detection unit 14 monitors the temperature of the fixing device and detects an abnormality of a discharge nozzle by printing and by optically reading a detection pattern of the discharge nozzle. The abnormality detection unit 14 is achieved by software other than the application program 18 and the web browser 17.

The determination unit 15 determines which program is active and being executed in the image forming apparatus 103. Generally, on an operating system (OS) capable of multi-tasking, a plurality of programs separately occupies the CPU during the time allocated by the time slice mechanism. It appears to a user that multiple programs execute in parallel. Among the multiple programs, the program that displays the screen at the forefront is the active program. When one program is operating on the entire screen, the program is an active program. The active program receives an operation of the user. Since programs are displayed in units of windows, an active program is also referred to as an active window.

The determination unit 15 inquires of the OS about the program being activated to check the program. Further, the determination unit 15 inquires of the OS about an active program among the activated programs to check the active program. The determination unit 15 has a program name or identification information of the web browser in advance, and determines whether the web browser is active by comparing a response from the OS with the program name or identification information of the web browser. The determination unit 15 is realized by software other than the application program 18 and the web browser 17.

When an active program operating in the image forming apparatus 103 is an application program, the switching unit 16 switches the active program to a web browser. When the web browser is not activated, the switching unit 16 specifies the program name or identification information of the web browser and requests the OS to activate the web browser. The web browser immediately after activation automatically becomes an active program. If the web browser has already been activated, the switching unit 16 specifies the program name or identification information of the web browser and requests the OS to activate the web browser. Therefore, the web browser is displayed closest to the user (at the forefront) on the operation panel 440 of the image forming apparatus 103. The switching unit 16 is realized by software other than the application program 18 and the web browser 17.

Registration of Image Forming Apparatus in Server

Figure 6:
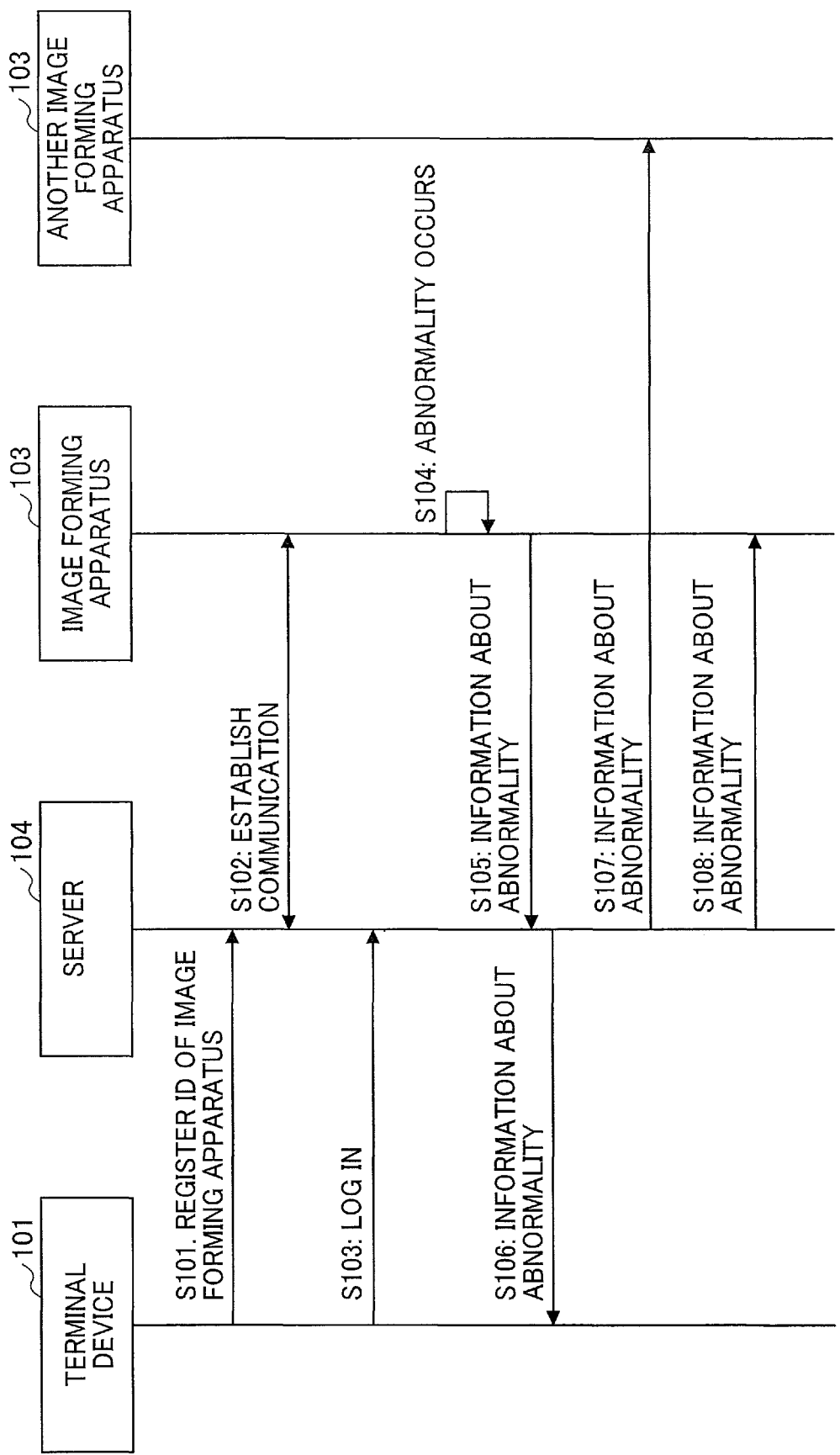
FIG. 6 is a sequence diagram illustrating a procedure in which an administrator operates a terminal device to register the image forming apparatus into the server.

Now, a description is given of a registration of the image forming apparatus 103 in the server 104 with reference to FIG. 6.

FIG. 6 is a sequence diagram illustrating an example of a procedure in which the administrator operates the terminal device 101 to register the image forming apparatus 103 in the server 104.

In step S101, the administrator operates the terminal device 101 to connect to the server 104. Since the display control unit of the terminal device 101 displays the login screen, the administrator operates the terminal device 101 to input authentication information (user name and password). The communication unit 11 of the terminal device 101 transmits the authentication information to the server 104. It is assumed that the authentication has succeeded, and the administrator has logged in. When a web page to register the image forming apparatus 103 is displayed on the terminal device 101, the administrator inputs the required items. For example, the administrator inputs an ID, an IP address, a manufacturer, and a product model indicated in Table 1. The communication unit of the terminal device 101 transmits the information input by the administrator to the server 104. Note that the server 104 may assign the ID.

In step S102, the communication unit 21 of the server 104 receives the information including the ID of the image forming apparatus 103 and stores the information into the device information storage unit 29. Accordingly, the information acquisition unit 23 of the server 104 communicates with the image forming apparatus 103 by designating the IP address. Note that information of the server 104 to be authenticated by the image forming apparatus 103 may be set. The communication is preferably achieved by a communication method such as WebSocket in which bidirectional communication is maintained.

In step S103, when a general user causes the terminal device 101 to monitor the image forming apparatus 103, the general user operates the terminal device 101 to connect to the server 104. The display control unit of the terminal device 101 displays the login screen, the general user operates the terminal device 101 to input authentication information (i.e., user name and password). The communication unit of the terminal device 101 transmits the authentication information to the server 104. It is assumed that the authentication has succeeded, and the general user has logged in. When a communication between terminal device 101 and the server 104 is established, bidirectional communication is maintained by WebSocket.

In step S104, an abnormality occurs in the image forming apparatus 103.

In step S105, the information notification control unit 32 of the image forming apparatus 103 transmits information about the abnormality to the server 104 using bidirectional communication.

In step S106, the information acquisition unit 23 of the server 104 receives the information related to the abnormality, and the communication unit 21 of the server 104 transmits the information related to the abnormality to the terminal device 101 capable of bidirectional communication. The information on the abnormality is transmitted as screen information that is displayed by the web browser.

In step S107, similarly, the communication unit 21 of the server 104 transmits information on the abnormality of the image forming apparatus 103 in which the abnormality has occurred, to another image forming apparatus 103. In step S108, the communication unit 21 of the server 104 transmits information on the abnormality in the image forming apparatus 103, to the image forming apparatuses 103. The information on the abnormality is transmitted as screen information that is displayed by the web browser.

Thus, since the server 104 performs bidirectional communication with the registered image forming apparatus 103 and the terminal device 101, when an abnormality occurs in the image forming apparatus 103, another image forming apparatus 103 displays information about the abnormality in the image forming apparatus 103 substantially in real time. The transmission of the information on the abnormality from the server 104 to the image forming apparatus 103 may be performed in response to polling from the image forming apparatus 103 having the abnormality to the server 104.

Operation Procedure

Figure 7:
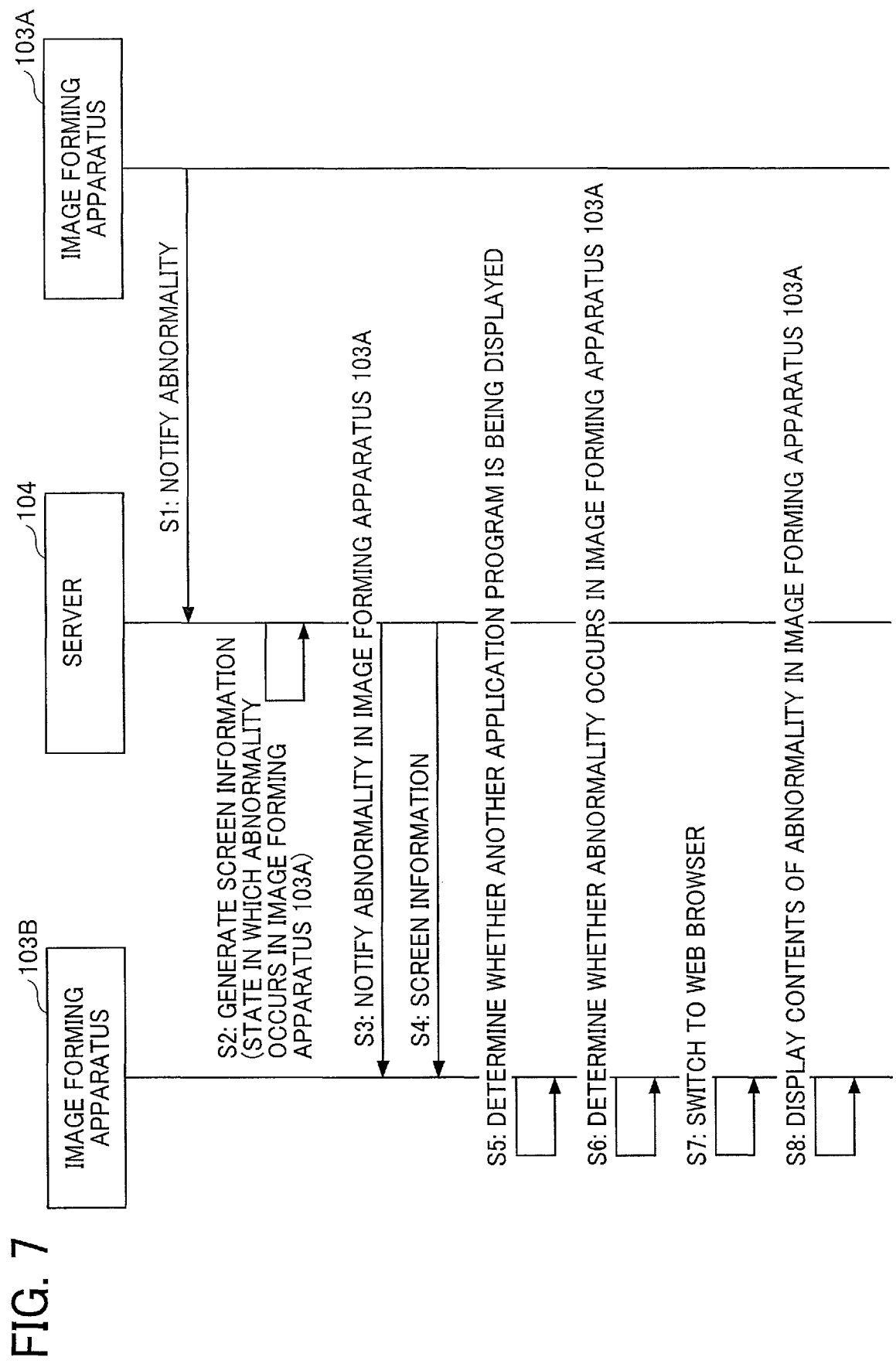
FIG. 7 is a sequence diagram illustrating a process in which the image forming apparatus displays information on an abnormality occurring in the image forming apparatus.

A description is given of an overall operation of the information processing system 100 with reference to FIG. 7.

FIG. 7 is a sequence diagram illustrating an example of a process in which the image forming apparatus 103B displays information about an abnormality occurring in the image forming apparatus 103A.

In step S1, the abnormality detection unit 14 in the image forming apparatus 103A detects an abnormality occurring in the image forming apparatus 103A. The communication unit 11 of the image forming apparatus 103A transmits information on the abnormality to the server 104 to notify the abnormality in the image forming apparatus 103A.

In step S2, the communication unit 21 of the server 104 receives the information on the abnormality in the image forming apparatus 103A, and the screen information generation unit 22 of the server 104 generates screen information for the image forming apparatus 103B to display that the abnormality has occurred in the image forming apparatus 103A.

In step S3, the communication unit 21 of the server 104 transmits information notifying that an abnormality has occurred in the image forming apparatus 103A. Then, in step S4, the communication unit 21 of the server 104 transmits the screen information generated in step S2 to the image forming apparatus 103B. The information indicating occurrence of the abnormality transmitted by the server 104 includes information on the abnormality. Further, the communication unit 21 transmits information indicating occurrence of an abnormality, and the screen information created in step S2 to the image forming apparatus 103A in which the abnormality has occurred as well as the image forming apparatus 103B. Therefore, each image forming apparatus 103 display information about an abnormality on the web browser regardless of whether an abnormality has occurred or not. Note that, since the screen is automatically switched due to the occurrence of the abnormality in the image forming apparatus 103A, the switching to the web browser described in the present embodiment is not performed in the image forming apparatus 103A. However, in the image Ruining apparatus 103A in which the abnormality occurs, switching to the web browser may be performed in the method described in the present embodiment.

Note that the communication unit 21 may transmit the information indicating the occurrence of the abnormality and the screen information generated in step S2, simultaneously or separately. Further, the screen information may also serve as information indicating that an abnormality has occurred.

In step S5, the communication unit 21 of the image forming apparatus 103B receives the occurrence of the abnormality and the screen information generated in step S2. The communication unit 21, for example, detects that an abnormality has occurred in another image forming apparatus 103 based on the information indicating that an abnormality has occurred, or detects that an abnormality has occurred in another image forming apparatus 103 by screen information. Alternatively, the communication unit 21 detects that switching to the web browser is to be performed when screen information is simply received regardless of occurrence of an abnormality. When at least the screen information is received, the determination unit 15 determines which program is active. In other words, the determination unit 15 determines whether the web browser is active. If the web browser is not active, the image forming apparatus 103B cannot display screen information (information about the status of the device). In FIG. 7, it is assumed that the web browser is not active.

In step S6, when the web browser is not active, the determination unit 15 checks the contents of an abnormality in the image forming apparatus 103A. For example, the determination unit 15 determines whether the abnormality is to be immediately notified to the user. This determination is made to distinguish whether the contents of the abnormality are urgent or not. The abnormality to be notified to the user is determined based on, for example, a code indicating the type of abnormality included in the information that the abnormality has occurred. Regardless of the contents of the abnormality, when the image forming apparatus 103B receives the screen information, the information that the abnormality has occurred, and the contents of the abnormality may be displayed.

In step S7, in the case of an abnormality to be immediately notified to the user, the switching unit 16 of the image forming apparatus 103B switches the active program to the web browser. In other words, the web browser is set to a status in which an operation from a user is acceptable in response to the receipt of the screen information by the communication unit 11 when the image forming apparatus 103B displays the screen of another application program such as a remote desktop application program. When the web browser is not activated, the switching unit 16 requests the OS to activate the web browser, then the OS activates the web browser.

In step S8, the web browser displays the screen information generated in step S2 on the operation panel That is, the information that an abnormality has occurred in the image forming apparatus 103A and the contents of the abnormality (information on the abnormality) are displayed. Since the web browser is active, a user operation is acceptable. For example, when the user presses the confirmation, the operation reception unit 13 receives the confirmation, and the communication unit 11 transmits the confirmation to the server 104. Alternatively, the user input changes to the setting value of the image forming apparatus 103A in order to resolve the abnormality.

The server 104 displays on the display 206 that at least the abnormality in the image forming apparatus 103A has been confirmed. Another user viewing the display 206 determines whether the abnormality in the image forming apparatus 103A needs to be responded. Alternatively, the server 104 may transmit the completion of confirmation to each of the image forming apparatuses 103 to notify that the abnormality occurred in the image forming apparatus 103A has been confirmed. In this case, each image forming apparatus 103 receives the screen information so as to display that the abnormality occurred in the image forming apparatus 103A is recognized by the user.

Thus, even if a program other than the web browser is active, the image forming apparatus 103B according to the present embodiment switches to the web browser and displays information about an abnormality occurring in another image forming apparatus 103A.

Details of Processing in Server 104 and Image Forming Apparatus 103B

Figure 8:
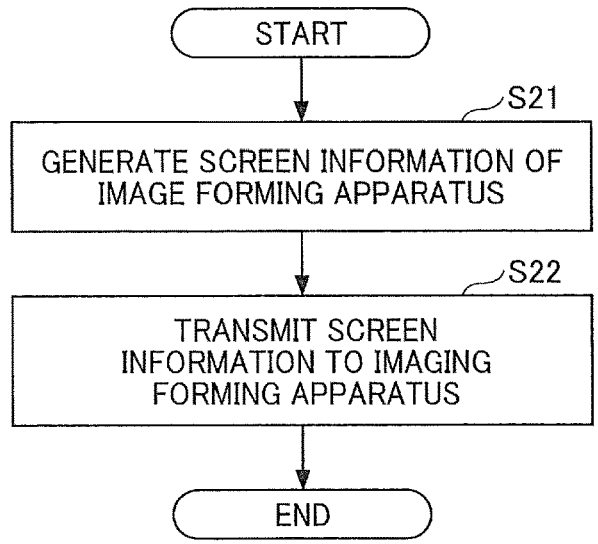
FIG. 8 is a flowchart of details of processing performed by the server.

FIG. 8 is an example of a flowchart of details of processing performed by the server 104. Note that the process of FIG. 8 starts when the server 104 receives information about an abnormality.

The screen information generation unit 22 of the server 104 generates screen information for the image forming apparatus 103B to display that an abnormality has occurred in the image forming apparatus 103A (step S21).

The communication unit 21 of the server 104 transmits the screen information generated by the screen information generation unit 22, to the image forming apparatus 103B (step S22).

Figure 9:
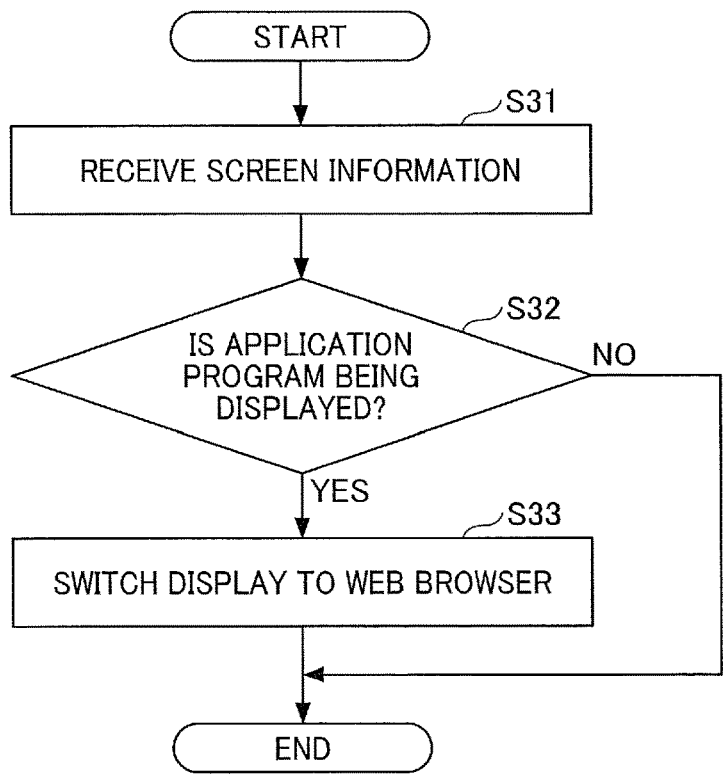
FIG. 9 is a flowchart of details of processing performed by the image forming apparatus.

FIG. 9 is an example of a flowchart illustrating details of processing performed by the image forming apparatus 103B. Note that the process of FIG. 9 starts while the image forming apparatus 103B executes an application program.

The communication unit 11 of the image forming apparatus 103B receives information of the occurrence of the abnormality and the screen information (step S31).

Accordingly, the determination unit 15 determines whether an application program other than the web browser is being displayed (whether the application program other than the web browser is active) (step S32). When the web browser is being displayed, in other words, when an application program other than the web browser is not being displayed (NO in step S32), the process of FIG. 9 is completed.

When an application program other than the web browser is being displayed (YES in step S32), the switching unit 16 switches the active program to the web browser (step S33). The web browser is displayed at the forefront of the operation panel 440. As a result, the web browser displays a screen generated based on the screen information received from the server 104 (the information that an abnormality has occurred in the image forming apparatus 103A and the contents of the abnormality) on the operation panel 440.

Screen Example

Figure 10:
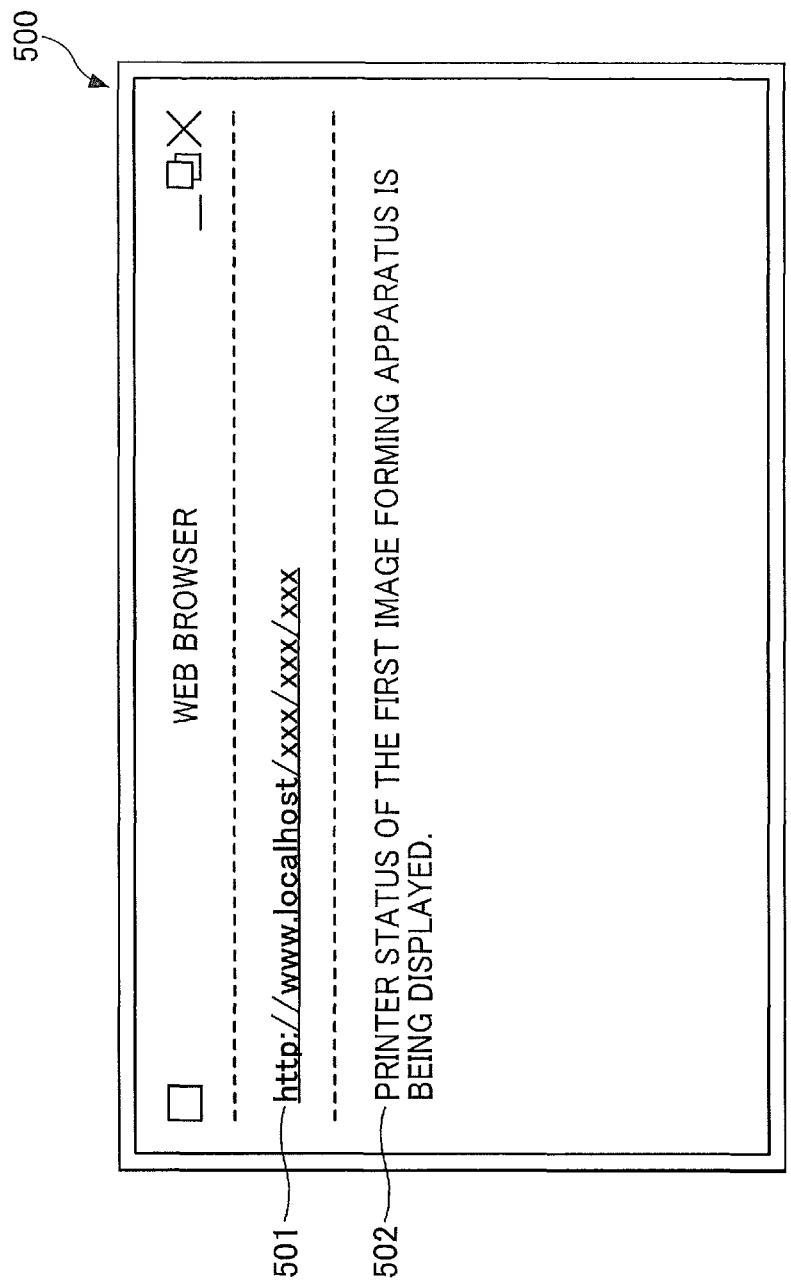
FIG. 10 is a diagram illustrating a screen of the image forming apparatus, displaying a status of the image forming apparatus on a web browser.
Figure 11:
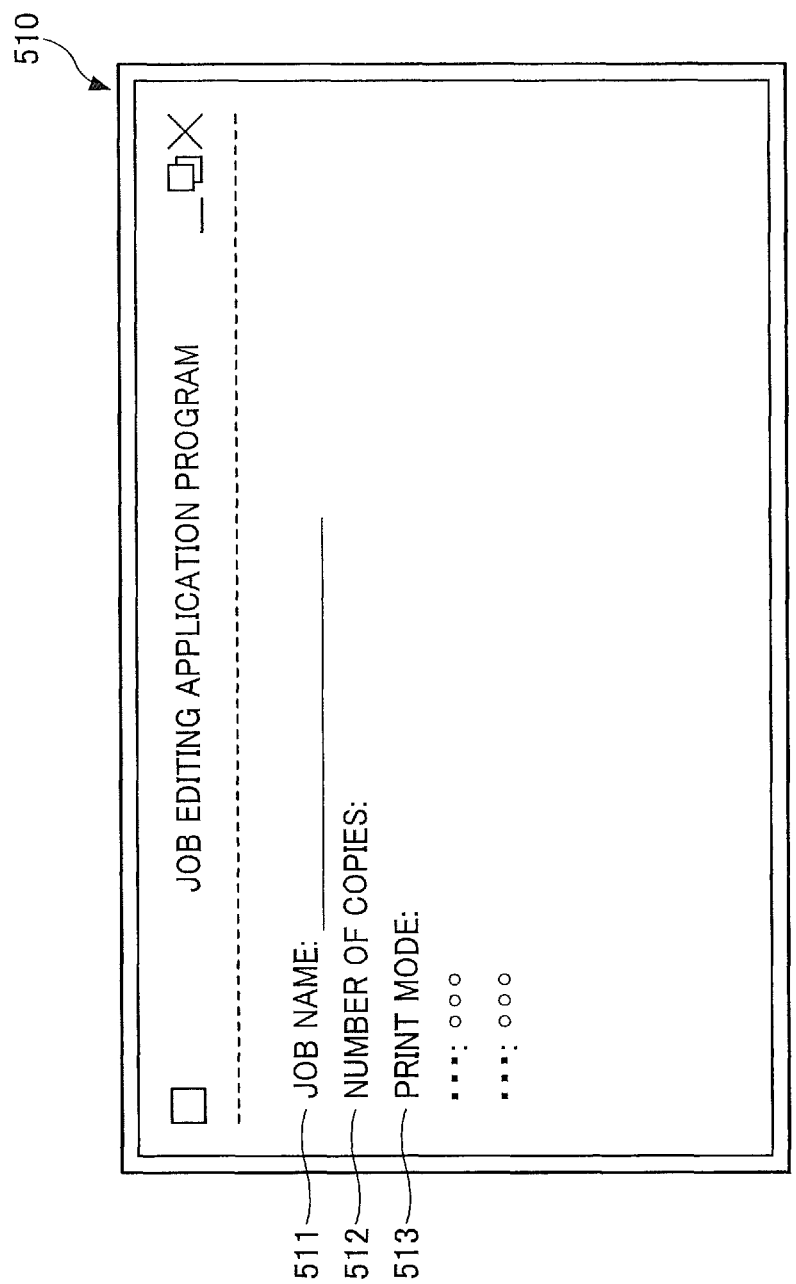
FIG. 11 is a diagram illustrating a screen of the image forming apparatus, displaying an application program of the image forming apparatus.
Figure 12:
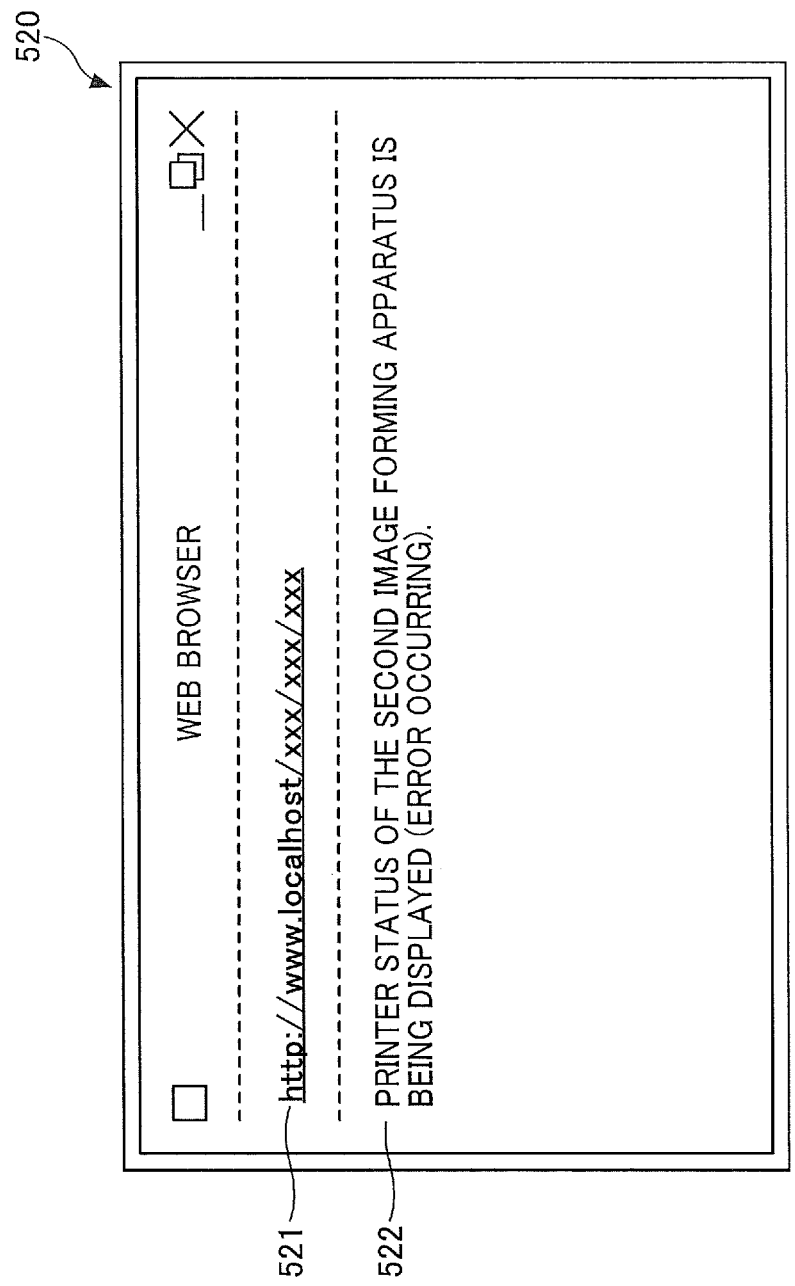
FIG. 12 is a diagram illustrating a screen of an image forming apparatus, displaying a status of another image forming apparatus on the web browser.

A description is given of an example of a screen displayed by the image forming apparatus 103B with reference to FIGS. 10 to 12.

FIG. 10 is an example of a screen 500 of the image forming apparatus 103B, displaying the status of the image forming apparatus 103B on the web browser. Since the screen 500 is the screen of the web browser, a uniform resource locator (URL) 501 of the connection destination is displayed on the screen 500. The screen 500 displays a status 502 of the image forming apparatus 103B (own apparatus).

FIG. 11 is an example of a screen 510 of the image forming apparatus 103B, displaying an application. The screen 510 displays the status of the image forming apparatus 103B. "JOB NAME" displayed on the screen 510 and indicated by reference numeral 511 is a file name of a print job being executed by the image forming apparatus 103B. "NUMBER OF COPIES" displayed on the screen 510 and indicated by reference numeral 512 is the number of copies set in the print job. "PRINT MODE" displayed on the screen 510 and indicated by reference numeral 513 is a setting of print mode, e.g., a color mode or a monochrome mode.

The screen 510 in FIG. 11 is a print job edit screen, but the present embodiment is not limited to this application program, and the image forming apparatus 103B activates any application and accepts various operations.

Note that the image forming apparatus 103B switches between a web browser and any application program in accordance with the status of the image forming apparatus 103B. For example, when an abnormality occurs while any application program is being displayed, the image forming apparatus 103B switches to the web browser. Therefore, when an abnormality occurs in the image forming apparatus 103B, the image forming apparatus 103B displays the status (for example, abnormality) of the image forming apparatus 103B by switching to the web browser even while any application program is being displayed.

In the present embodiment, when the image forming apparatus 103B receives screen information from the server 104 while the image forming apparatus 103B displays an application program, the application program is switched to the web browser.

FIG. 12 is an example of a screen 520 of the image forming apparatus 103B, displaying the status of the image forming apparatus 103A on the web browser of the image forming apparatus 103B. The configuration of the screen 520 is the same as the screen 500 of FIG. 10, but the screen 520 displays the status of image forming apparatus 103A.

Thus, even if the image forming apparatus 103B displays an application program as illustrated in FIG. 11, when a screen information is received, the image forming apparatus 103B displays the status of the image forming apparatus 103A connected to the server 104.

Main Effects

As described above, while the image forming apparatus 103B according to the present embodiment executes an application program such as a remote desktop application program and displays a screen on the operation panel, when an abnormality occurs in the image forming apparatus 103A, the screen displayed on the operation panel of the image forming apparatus 103B is automatically switched to the web browser. Therefore, even while the application program is in operation in the image forming apparatus 103B, the image forming apparatus 103B displays information related to the image forming apparatus 103A. The user using the image forming apparatus 103B notices that an abnormality occurs in the image forming apparatus 103A in a short time from the occurrence of the abnormality.

Other Application Examples

The present disclosure is not limited to the embodiments described above, and various modifications and improvements are possible without departing from the gist of the present disclosure.

For example, the configuration example illustrated in FIG. 5 is divided according to the main functions in order to facilitate understanding of processing by the server 104 and the image forming apparatuses 103A and 103B. The present disclosure is not limited by the method of dividing the unit of processing, or the name of the processing. The processing of the server 104 and the image forming apparatus 103 is divided into more segmentalized processing units according to the processing content. Further, one processing unit is divided so as to include more processes.

The devices and apparatuses described in the examples are merely illustrative of one of a plurality of computing environments for implementing the present embodiment. In some embodiments, the server 104 includes multiple computing devices such as server clusters. The plurality of computing devices is configured to communicate with one another via any type of communication link, including a network or shared memory to implement the processing described in the present embodiment.

Further, the server 104 is configured to share various combinations of the processing steps described in the present embodiment, such as the sequence illustrated in FIG. 7. For example, a process executed by a predetermined unit may be executed by a plurality of information processing devices included in the server 104. The server 104 may be integrated into one server or may be divided into a plurality of servers.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An information processing system comprising:
a plurality of apparatuses including a first apparatus and a second apparatus; and
an information processing apparatus configured to communicate with the plurality of apparatuses,
the first apparatus including:
a first communication unit configured to receive screen information about the second apparatus sent from the information processing apparatus, the screen information including abnormality information indicating occurrence of an abnormality in the second apparatus when the information processing apparatus receives the abnormality information from the second apparatus;
an operation panel configured to display a screen of a second application program, the screen of the second application program being different from a screen of a first application program and not being displayed concurrently with the screen of the first application program, the screen of the first application program including the screen information including the abnormality information; and
a switching unit configured to, in response to receipt of the screen information by the first communication unit, automatically switch the operation panel from displaying the screen of the second application program to displaying the screen of the first application program including the screen information including the abnormality information,
the information processing apparatus including a second communication unit configured to transmit the screen information to the first apparatus.

2. The information processing system according to claim 1,
wherein the first application program is a web browser, and
wherein the switching unit is configured to switch the screen of the second application program to a screen of the web browser and display the screen of the web browser in response to the receipt of the screen information by the first communication unit, when the first apparatus displays the screen of the second application program.

3. The information processing system according to claim 2,
wherein the information processing apparatus further includes a screen information generation unit,
wherein the screen information generation unit is configured to generate the screen information,
wherein the second communication unit included in the information processing apparatus is configured to transmit the screen information generated by the screen information generation unit to the first apparatus, and
wherein the switching unit of the first apparatus switches the screen of the second application program to the screen of the web browser and displays the screen of the web browser in response to the receipt of the screen information by the first communication unit, when the first apparatus displays the screen of the second application program.

4. The information processing system according to claim 3,
wherein the switching unit is configured to set the web browser to a status in which an operation is acceptable in response to the receipt of the screen information by the first communication unit, when the first apparatus displays the screen of the second application program.

5. The information processing system according to claim 1, wherein the abnormality information includes information pertaining to a paper jam, a temperature, image formation, sheet feeding, and/or a lack of a sheet.

6. An apparatus comprising:
a communication unit configured to receive screen information about another apparatus, the screen information being sent from an information processing apparatus configured to communicate with the apparatus, the screen information including abnormality information indicating occurrence of an abnormality in the another apparatus when the information processing apparatus receives the abnormality information from the another apparatus;
an operation panel configured to display a screen of a second application program, the screen of the second application program being different from a screen of a first application program and not being displayed concurrently with the screen of the first application program, the screen of the first application program including the screen information including the abnormality information; and
a switching unit configured to, in response to receipt of the screen information by the communication unit, automatically switch the operation panel from displaying the screen of the second application program to displaying the screen of the first application program to display the screen of the first application program including the screen information including the abnormality information.

7. A display method to be performed by an information processing system including a first apparatus, a second apparatus, and an information processing apparatus configured to communicate with the first apparatus and the second apparatus, the display method comprising:
receiving screen information about the second apparatus sent from the information processing apparatus to a first communication unit of the first apparatus, the screen information including abnormality information indicating occurrence of an abnormality in the second apparatus when the information processing apparatus receives the abnormality information from the second apparatus;
displaying a screen of a second application program, the screen of the second application program being different from a screen of a first application program and not being displayed concurrently with the screen of the first application program, the screen of the first application program including the screen information including the abnormality information; and
in response to receipt of the screen information, automatically switching from displaying the screen of the second application program to displaying the screen of the first application program including the screen information including the abnormality information.

8. A non-transitory, computer-readable storage medium storing computer-readable program code that causes a computer of a first apparatus, which is communicable to an information processing apparatus, to execute:
receiving screen information about a second apparatus sent from the information processing apparatus to a first communication unit of the first apparatus, the screen information including abnormality information indicating occurrence of an abnormality in the second apparatus when the information processing apparatus receives the abnormality information from the second apparatus;
displaying a screen of a second application program, the screen of the second application program being different from a screen of a first application program and not being displayed concurrently with the screen of the first application program, the screen of the first application program including the screen information including the abnormality information; and
in response to receipt of the screen information, automatically switching from displaying the screen of the second application program to displaying the screen of the first application program including the screen information including the abnormality information.

* * * * *